United States Patent [19]

Sink

[11] Patent Number: 4,801,157

[45] Date of Patent: Jan. 31, 1989

[54] FOLDING MAP

[75] Inventor: Richard K. Sink, St. Petersburg, Fla.

[73] Assignee: Rallye Group, Inc., St. Petersburg, Fla.

[21] Appl. No.: 90,915

[22] Filed: Aug. 31, 1987

[51] Int. Cl.4 .............................................. G09B 29/00
[52] U.S. Cl. ......................................... 283/35; 253/34
[58] Field of Search .................................... 283/34, 35

[56] References Cited

U.S. PATENT DOCUMENTS

| | | | |
|---|---|---|---|
| 2,118,964 | 5/1938 | Bonnaire | 283/34 X |
| 2,179,172 | 11/1939 | Bonnaire | |
| 2,471,552 | 5/1949 | Specter et al. | 283/35 |
| 2,615,732 | 10/1952 | Falk | 283/34 |
| 4,210,347 | 7/1980 | Robbins et al. | |

FOREIGN PATENT DOCUMENTS 2082503  3/1982  United Kingdom ................. 283/35

Primary Examiner—Paul A. Bell
Attorney, Agent, or Firm—Wegner & Bretschneider

[57] ABSTRACT

A folding map is formed of a single sheet which is folded in an alternating accordion-like fashion. A plurality of panels are defined between the folds, each panel having a map portion and an information-bearing portion. The panels are of decreasing width so that the information-bearing portion of each panel are visible when the map is completely folded. The map can further include a key printed on the front panel, and a color-matching system and/or a mark system which facilitate location of a desired area on the map.

7 Claims, 2 Drawing Sheets

FOLDING MAP

BACKGROUND OF THE INVENTION

This invention relates to folding maps, and more particularly to folding maps having quick and easy access to a desired portion of the map.

When trying to locate a desired geographical area on a conventional folding map, there is no way to determine, before opening the map, on what part of the map the desired area is printed. Further, even if the particular area is know, it is usually necessary to unfold a large part, if not all, of the map in order to locate and view the desired area. Also, refolding a conventional folding map after it has been unfolded is notoriously difficult.

Several folding maps have been designed to overcome these drawbacks with conventional maps. One such map is shown in U.S. Pat. No. 4,210,347. This map is made up of a sheet which has a plurality of alternating accordion-like folds of decreasing width. The map is split into a north half and a south half, with each half having a plurality of panels which represent contiguous areas. The map further has a key and a color-matching system which allows for identification of the panel representing the desired area.

However, the map described in U.S. Pat. No. 4,210,347 suffers from several disadvantages. Namely, a user often will not want to take the time to use the color-matching identification system, desiring instead a more direct way to identify what area is represented on a given panel. Further, by printed contiguous areas on adjacent panels, the map is restricted to extended representation in only one direction (i.e., east-west), and cannot represent an area extending in more than one direction (i.e., both east-west and north-south). Also, the printing of contiguous areas from panel to panel precludes the use of the exposed edge portions of each panel for printing information concerning the panels thereon.

SUMMARY OF THE INVENTION

The present invention overcomes the difficulties involved with both conventional folding maps and the type described in U.S. Pat. No. 4,210,347 by providing a folding map made up of a sheet having a plurality of accordion-like alternating folds of decreasing width which define a plurality of panels therebetween, each of said panels comprising markings thereon representative of a given area, and further comprising an information-bearing portion containing information concerning the geographical area represented on the panel printed along an edge of the panel adjacent a fold, the information-bearing portions together forming a visible index.

Because of the decreasing width of each fold, the information-bearing portion of each panel is visible when the sheet is folded. Therefore, the user can easily identify and refer to the panel of the map contains the area of interest. Further because of the alternating "Z-folds", only the fold in the middle of the desired panel need be unfolded or flipped open. Thus, there is no complicated unfolding and refolding process. Also, the map can be opened to the desired area using only one hand.

In addition to the printed information on the information-bearing portions, it is also preferably that each portion be a different color. The map can then further comprise a key located on the front panel which represents the total area represented on all of the remaining panels. The key is also color coded, so that an area on the key is the same color as the color of the information-bearing portion of the panel pertaining to that area.

In addition to, or as a substitute for, the color-matching system, the information bearing portions could contain a number or a letter, and the same number or letter could then be printed on the corresponding area of the key.

It is not necessary that adjacent panels represent adjacent areas of land, or that all of the panels represent an area in the same scale. In fact, it may be desirable to have one panel which represents, for example, a large portion of a state, and another panel which represents a single city in larger scale.

BRIEF DESCRIPTION OF THE DRAWINGS

The invention can be better understood with reference to the preferred embodiment, which will be described in connection with the drawings, in which.

DETAILED DESCRIPTION OF THE INVENTION

Figure 1:
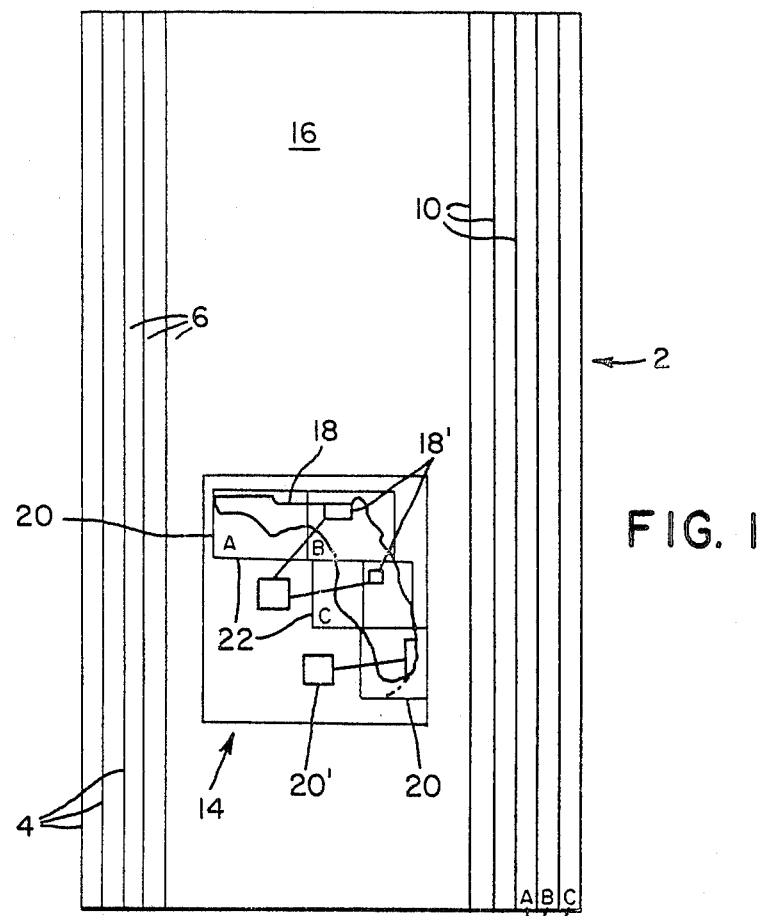
FIG. 1 is a front view of the folding map of the preferred embodiment shown completely folded.
Figure 2:
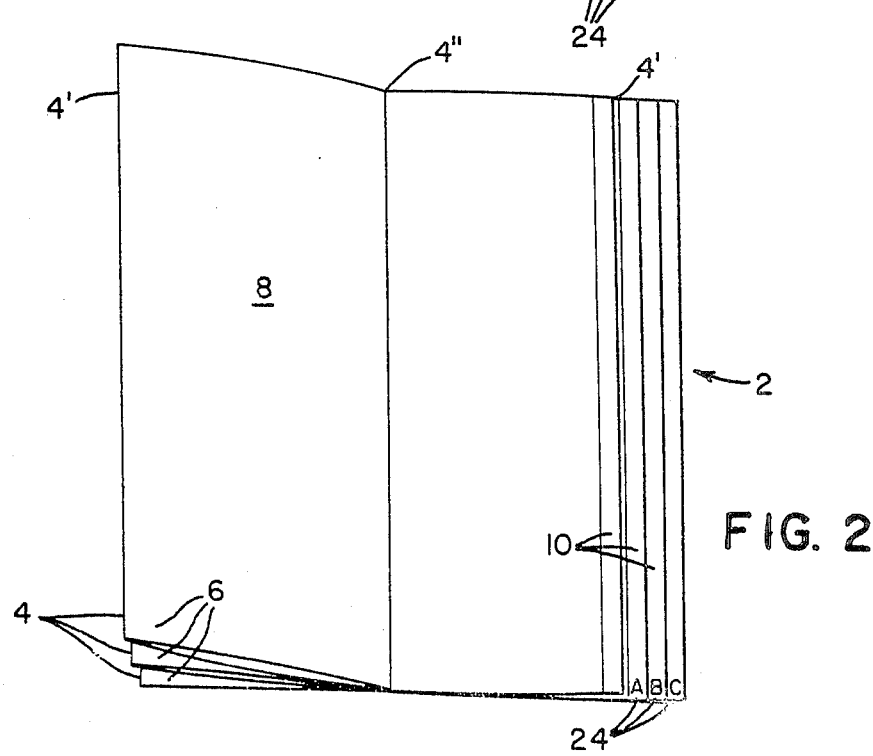
FIG. 2 is a front elevational view of the map of FIG. 1 shown opened to a panel.
Figure 3:
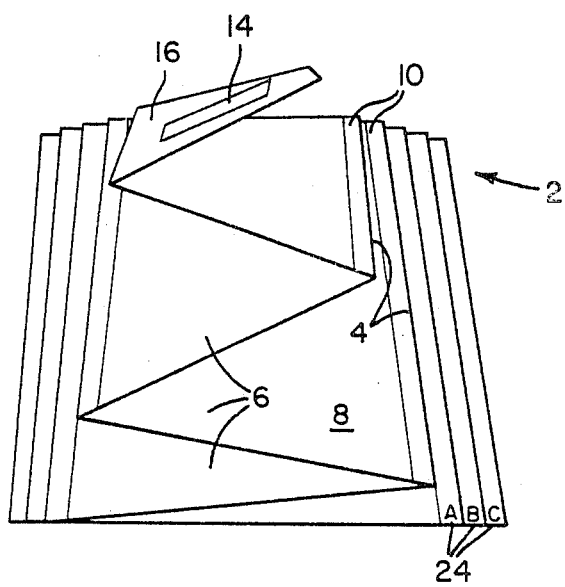
FIG. 3 is a perspective view of the map of FIG. 1 shown partially unfolded.

The preferred embodiment of the folding map is generally designated at 2 in FIGS. 1–3. The map 2 consists of a single sheet which has a plurality of accordion-like alternating folds 4. In FIG. 1, the map is shown completely folded. From the position shown in FIG. 1, the map can be opened at a single fold to reveal a panel 6, as shown in FIG. 2. As defined herein, a panel extends between two folds 4' which are in the same direction. At the approximate midpoint of each panel is a fold 4" in the opposite direction as the folds 4' at the two edges.

The distance between adjacent folds decreases from back to front (as seen in FIG. 1), so that the width of the panels gradually decreases in the same direction.

The map 2 is shown opened to a panel 6 in FIG. 2. Each panel is separated into a map portion 8 and an information-bearing portion 10. The map portion 8 contains markings describing a given geographical area. The information-bearing portion 10 is located along one lateral edge of the map portion 8 and contains written information along the length thereof which describes what is shown on that panel. Because of the decreasing width of the panels and the location of the information-bearing portions 10 on the panels 6, the information-bearing portions are visible when the map is in the folded position shown in FIG. 1.

Thus, a user who wishes to locate a given area can easily identify the appropriate panel by reading the information on the information-bearing portions. The user then simple lifts or flips the panel located in front of the desired panel, to thereby reveal the desired panel.

It should be noted that the folding map has panels 6 located on either side of front panel 16. The panels to the right of the front panel have the information-bearing portion 10 to the right of the map portion 8, whereas the panels to the left have the information-bearing portion to the left of the map portion.

In the preferred embodiment, each information-bearing portion 10 is a different color, and a key 14 is printed on the front panel 16 of map 2. Key 14 has an outline 18 of all of the area covered by the map, and also has a plurality of boxes 20, each box corresponding to an area covered by a panel. The portion of the outline 18 located within a particular box 20 is colored the same color as the panel corresponding to that box. This "color matching system" provides a second method by which the user can determine which panel corresponds to the area which the user wishes to locate.

As a third aide for locating a desired panel, each information-bearing portion 10 can have an identifying mark 24 thereon. This mark generally will be a single number or letter. Identifying marks 22 are also printed in or next to each box 20, with the mark in each box being identical to the mark 24 on the panel corresponding to that box. Thus, the user can also use the marks to determine which panel corresponds to the area which the user is trying to locate.

It is not necessary that adjacent panels represent contiguous areas, or that each panel represent areas in the same scale. In fact, in the embodiment shown in FIG. 1, boxes 20' point to smaller outlined areas 18' on the key 14. These smaller areas are printed in larger scale on a corresponding panel 6 of the map 2. In this embodiment, the boxes 20' are colored and have identifying marks on them which correspond to related colors marks on the corresponding panel.

For added ease in location of a desired panel, it is also possible that, for example, all of the panels to the right of the front panel 16 represent areas within a state, and all of the panels on the left side of the front panel represent cities within the state.

Because the geographical area represented on the map is not contiguous between adjacent panels, it is desirable that there be a certain amount of overlap in the area represented by adjacent map portions 8 (i.e., the geographical area at the edge of one panel 6 is also shown on the adjacent panel.). In this case, the overlap portion that is shown on both panels can be shaded on one or both of the panels. It would also be possible to employ indicators (not shown) along the edges of the map portions 8 which indicate which panel (preferably identifying the panel by its identifying mark 24) represents the area adjacent to each edge.

The sheet 2 can be made of any suitable material, but preferably is either made of, or coated with, a material which is impervious to liquids, so that liquids which are spilled within a vehicle do not damage the map. The map can also be coated with a UV coating which protects the map from fading due to exposure to sunlight.

Although the preferred embodiment is directed toward a highway map of a state, the present invention could also in conjunction with maps of intercoastal waterways, maritime maps or charts, aeronautical maps, or any other specialized guide map.

Having described the preferred embodiment of the invention, it is noted that many modifications are possible without departing from the spirit and scope of the invention. Therefore, the invention is not limited to the preferred embodiment, but is defined by the following claims:

I claim:

1. A folding map which represents a geographical area, comprising a sheet having a plurality of accordion-like alternating folds of decreasing width which define a plurality of panels therebetween, each of said panels comprising a map portion representing a portion of the geographical area and an information-bearing portion located along an edge of the map portion adjacent a fold containing information concerning the portion of the area represented on the map portion printed along the length thereof, wherein the geographical area represented by the map is not contiguous between adjacent panels, and wherein each information-bearing portion is a different color and is visible when the sheet is folded.

2. A folding map as claimed in claim 1, wherein a different color, and the map further comprises a front panel having a key printed thereon, said key having an outline of the area and a plurality of boxes, each box surrounding a portion of the outline, each portion of the outline being colored the same color as the color of an information-bearing portion of a panel representing a corresponding portion of the area.

3. A folding map as claimed in claim 2, wherein the map portions of adjacent panels represent portions of the geographical area extending both in a north-south direction and an east-west direction.

4. A folding map as claimed in claim 2, wherein the map portion of at least one panel represents a portion of the geographical area in a larger scale than does the map portion of at least one other panel.

5. A folding map as claimed in claim 1, wherein the map portions of adjacent panels represent portions of the geographical area extending both in a north-south direction and an east-west direction.

6. A folding map as claimed in claim 1, wherein the map portion of at least one panel represents a portion of the geographical area in a larger scale than does the map portion of at least one other panel.

7. A folding map as claimed in claim 1, wherein a portion of the geographical area represented by the map portion of one panel is also shown on the map portion of an adjacent panel.

* * * * *